United States Patent [19]
Manes et al.

[11] Patent Number: 5,814,171
[45] Date of Patent: Sep. 29, 1998

[54] CELL AUDITING SCHEME FOR STORAGE LIBRARY SYSTEM

[75] Inventors: Joseph P. Manes, Arvada; Donald B. Wait, Boulder; Robert S. Creager, Berthood; Adam Mehlberg, Longmont; John S. Todor, Arvada; Joseph P. Falace, Lousiville; Scott D. Wilson, Westminster, all of Colo.

[73] Assignee: Storage Technology Corporation, Louisville, Colo.

[21] Appl. No.: 751,134

[22] Filed: Nov. 15, 1996

[51] Int. Cl.⁶ ...................................................... B32B 31/00
[52] U.S. Cl. ................ 156/64; 250/559.06; 250/559.44; 264/132; 414/274
[58] Field of Search .............................. 156/64; 264/132, 264/408; 209/3.2, 576, 577, 583, 587; 250/559.06, 559.44; 414/274, 273

[56] References Cited

U.S. PATENT DOCUMENTS

| | | |
|---|---|---|
| 4,711,690 | 12/1987 | Haghiri-Tehrani .................. 156/309.6 |
| 5,129,974 | 7/1992 | Aurenius .................................. 156/64 |
| 5,143,193 | 9/1992 | Geraci .................................. 414/273 X |
| 5,226,779 | 7/1993 | Yeakley . |
| 5,235,474 | 8/1993 | Searle .................................. 414/273 X |
| 5,236,296 | 8/1993 | Ostwald . |
| 5,242,259 | 9/1993 | Yeakley . |
| 5,277,540 | 1/1994 | Helms et al. . |
| 5,303,034 | 4/1994 | Carmichael et al. . |
| 5,321,353 | 6/1994 | Furness . |
| 5,323,327 | 6/1994 | Carmichael et al. .................. 364/478 |
| 5,331,232 | 7/1994 | Moy et al. . |
| 5,403,140 | 4/1995 | Carmichael et al. .................. 414/280 |
| 5,418,664 | 5/1995 | Ostwald . |
| 5,421,697 | 6/1995 | Ostwald . |
| 5,456,569 | 10/1995 | Cheatham et al. . |
| 5,479,581 | 12/1995 | Kleinschnitz . |

FOREIGN PATENT DOCUMENTS 61-18143  1/1986  Japan ........................................ 156/64

OTHER PUBLICATIONS

"Mechanical Design of an Optical Disk Autocharger", Hewlett–Packard Journal, Dec. 1990.

*Primary Examiner*—David A. Simmons
*Assistant Examiner*—Paul M. Rivard
*Attorney, Agent, or Firm*—Brooks & Kushman P.C.

[57] ABSTRACT

A method and apparatus is provided for auditing cartridges and empty cells in a storage library system including a plurality of cells for storing cartridges and further including a robotically actuated hand assembly. A line-scan camera is secured to the hand assembly, and a visible pattern is positioned within each cell such that the visible pattern is readable by the line-scan camera when the line-scan camera is moved to a position adjacent the particular cell if the cell is empty. The visible pattern is positioned such that the presence of a cartridge within the particular cell would prevent viewing of the visible pattern within the cell by the line-scan camera. The line-scan camera is operated in a manner to search for the visible pattern within each cell for auditing numbers of cartridges and empty cells in the storage library system.

8 Claims, 4 Drawing Sheets

CELL AUDITING SCHEME FOR STORAGE LIBRARY SYSTEM

TECHNICAL FIELD

The present invention relates to a method and apparatus for auditing cartridges and empty cells in a storage library system which includes a robotically actuated hand assembly carrying a line-scan camera thereon.

BACKGROUND OF THE INVENTION

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a robotically movable arm. To retrieve information, the robotic arm is moved to position the hand near the inventory location of a desired media cartridge. The hand is then activated to grip the desired cartridge and move it from the library inventory location. The robotic arm with the hand gripping the cartridge then moves to an appropriate position to further process the cartridge. In this manner, the robotic hand manipulates the cartridge for access to information stored on the cartridge.

The inventory locations typically comprise cartridge storing cells provided in a stacked arrangement for convenient storage of large numbers of cartridges.

When performing a tape audit in a storage library system, it is necessary for the system to distinguish between unlabeled cartridges and empty cell locations. Historically, this has been accomplished by either having the robotically actuated hand assembly reach into each cell and mechanically sense whether or not a cartridge is present, or by using a proximity sensor mounted to the hand assembly which is dedicated to this function. Extending the robotically actuated hand assembly into each cell for auditing purposes adds significant delay to the machine audit time, and using a proximity sensor mounted to the hand assembly for auditing adds significant cost to the system and requires factory calibration.

Accordingly, it is desirable to provide an inexpensive method and apparatus for auditing cartridges and empty cells in a storage library system in a manner which improves upon system audit time.

DISCLOSURE OF THE INVENTION

The present invention overcomes the above-referenced shortcomings of prior art storage library systems by taking advantage of the line-scan camera which is typically secured to the hand assembly for reading cartridge labels and viewing calibration targets. By carefully orienting the line-scan camera on the hand assembly and displaying a visible pattern inside each cell such that the visible pattern is blocked from the camera's view when that cell is occupied by a cartridge, the same camera may be used to detect whether a particular cell is empty or occupied by an unlabeled cartridge. Accordingly, an inexpensive solution to the above-referenced storage library system auditing problem is achieved while improving system auditing time.

More specifically, the present invention provides a method of auditing cartridges and empty cells in a storage library system including a plurality of stacked cells for storing cartridges and further including a robotically actuated hand assembly. The method comprises: (1) providing a line-scan camera on the hand assembly; (2) positioning a visible pattern within each cell such that the visible pattern is readable by the line-scan camera when the line-scan camera is moved to a position adjacent to the particular cell if the particular cell is empty, and such that the presence of a cartridge within the particular cell would prevent viewing of the visible pattern by the line-scan camera; and (3) operating the line-scan camera in a manner to search for the visible pattern within each cell for auditing numbers of cartridges and empty cells in the storage library system.

The present invention further provides an apparatus for auditing cartridges and empty cells in a storage library system including a robotically actuated hand assembly. The apparatus comprises a line-scan camera secured to the hand assembly, and a visible pattern displayed within each cell such that the visible pattern is readable by the line-scan camera when the line-scan camera is positioned adjacent the particular cell if the particular cell is empty. The visible pattern is positioned such that the presence of a cartridge within the particular cell would prevent viewing of the visible pattern within the cell by the line-scan camera. The hand assembly is operative to move the line-scan camera in a manner to search for the visible pattern within each cell for auditing numbers of cartridges and empty cells in the storage library system.

Accordingly, an object of the present invention is to provide a method and apparatus for auditing cartridges and empty cells in a storage library system which improves system auditing time without substantially increasing cost.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
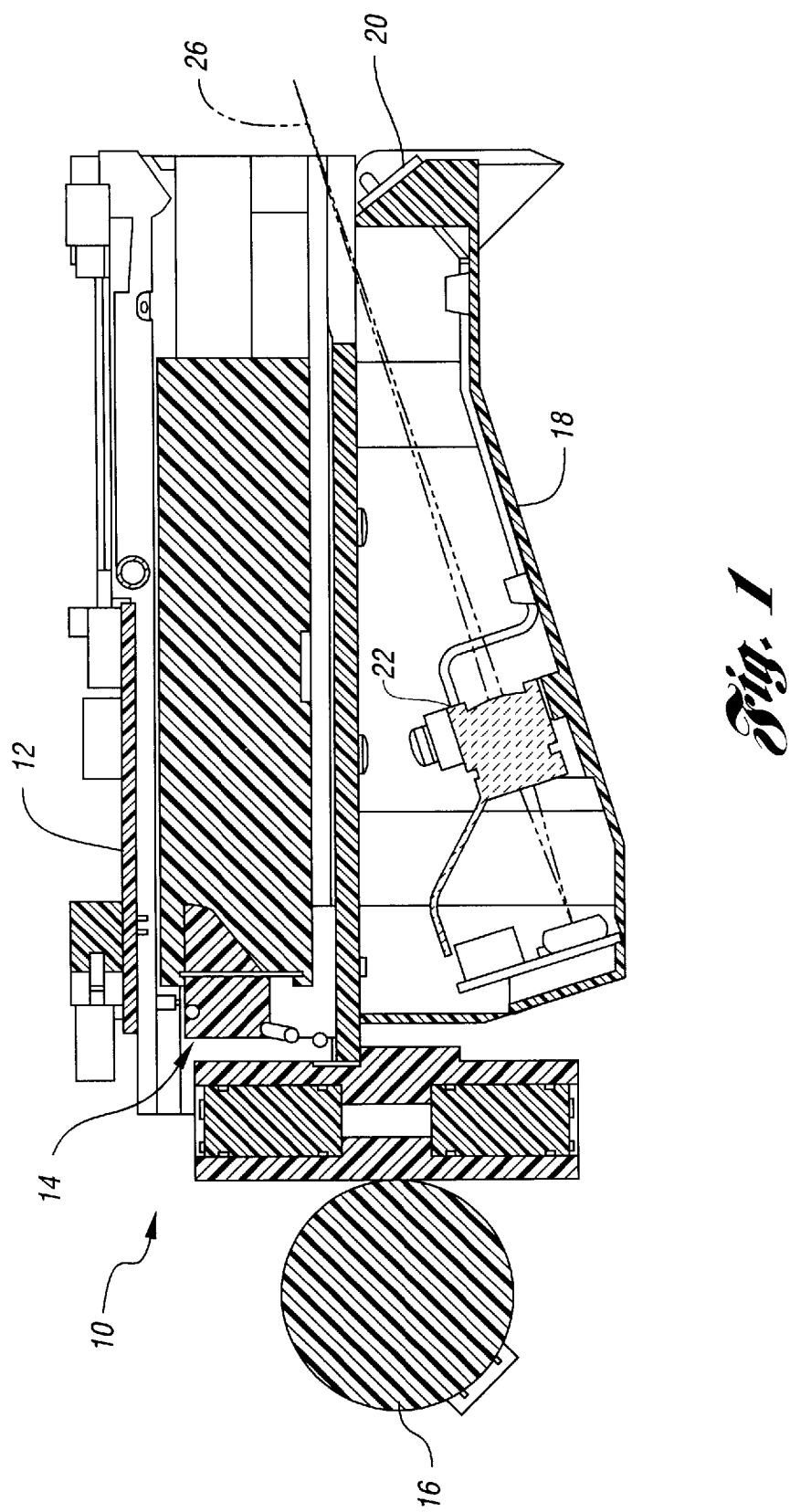
FIG. 1 shows a vertical cross-sectional view of a hand assembly incorporating a line-scan camera for use in accordance with the present invention.
Figure 2:
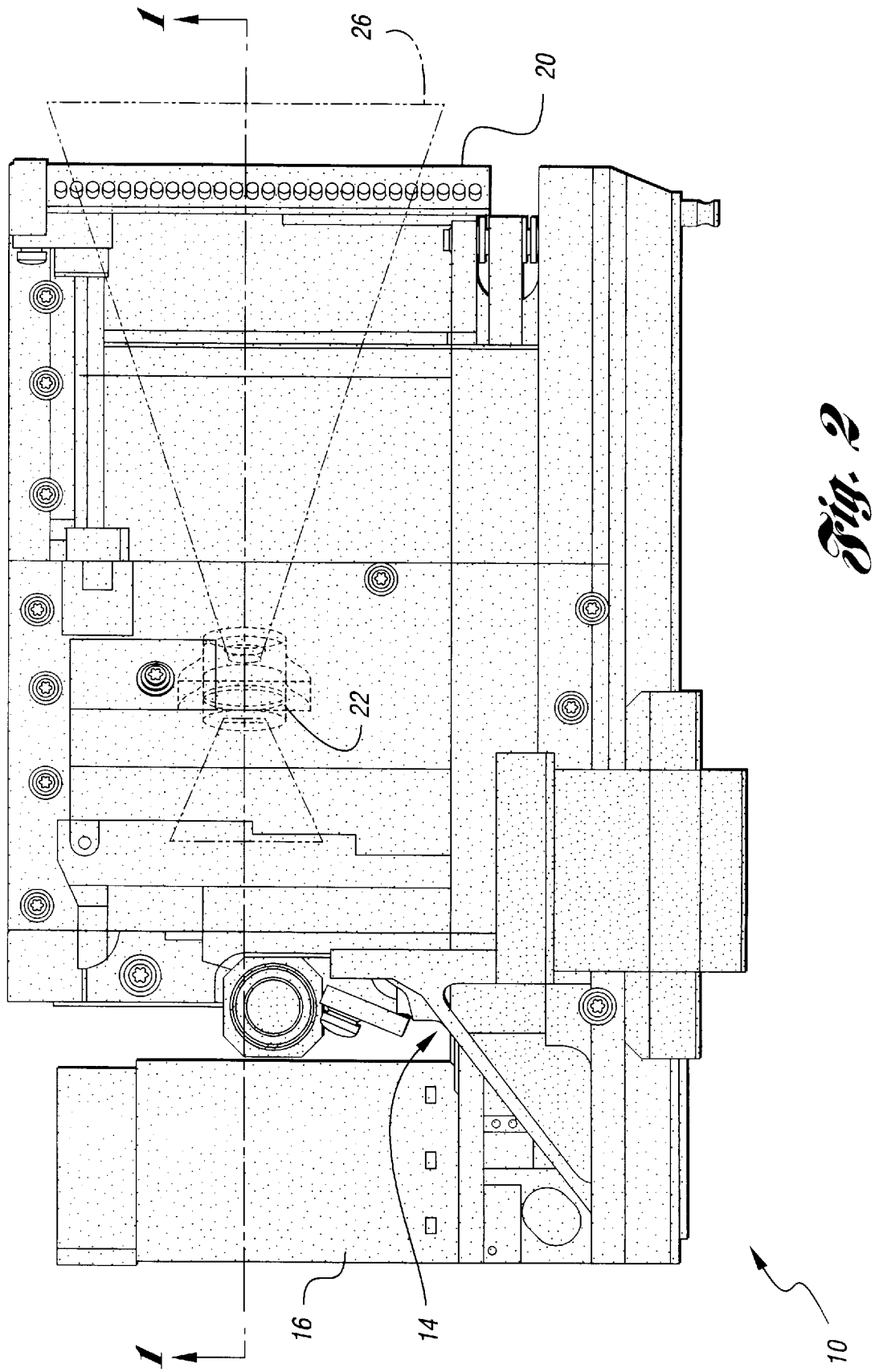
FIG. 2 shows a top plan view of the hand assembly and camera shown in FIG. 1.

FIGS. 1 and 2 show a hand and camera assembly 10 for use in accordance with the present invention. The hand and camera assembly 10 includes a hand frame 12 which slidably supports a movable carriage assembly 14. The carriage assembly 14 is movable by means of the motor 16 for moving cartridges out of the hand frame 12 for insertion into storage library system cells, and is also movable in the opposing direction for pulling cartridges out of cells.

The hand and camera assembly 10 further comprises a camera housing 18 mounted to the underside of the hand frame 12 for carrying a line-scan camera. The line-scan camera includes an LED board 20 which includes a plurality of surface mounted lights which light up the surface to be read by the camera. The camera also includes a lens 22 which projects an image from the pattern to be read by the camera onto the CCD chip 24. The CCD chip 24 is a long photosensitive chip with a horizontal slit therein which distinguishes light and dark lines on the projected image. The CCD chip is connected to a system computer for deciphering the pattern. The field of view 26 of the camera, as dictated by the lens 22, comprises a thin linear field to facilitate bar code-type pattern reading. The camera field of view 26 extends angularly upward away from the hand assembly 12, as shown in FIG. 1.

Figure 3:
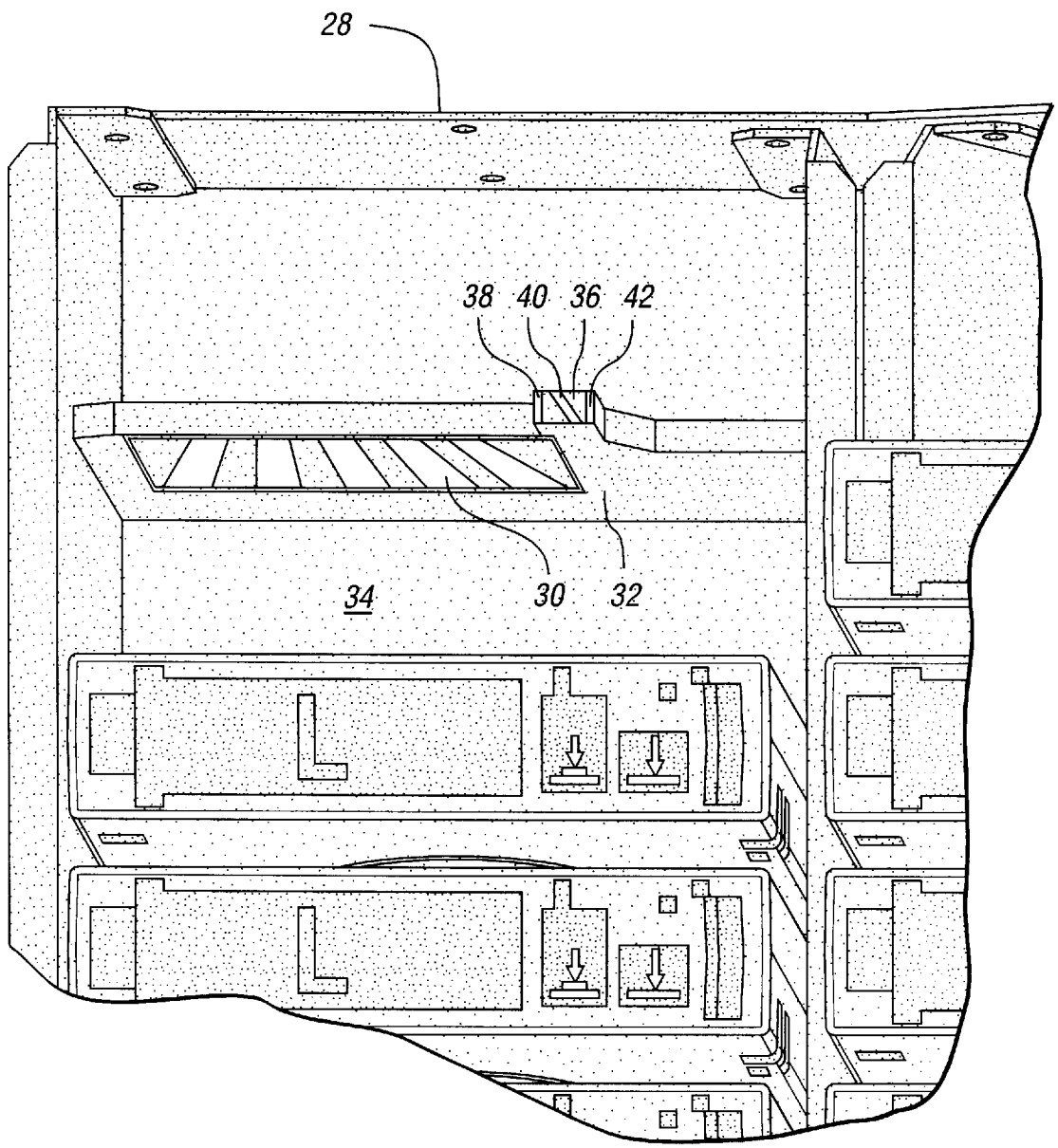
FIG. 3 shows a cut-away perspective view of a plurality of cells with one cell displaying a visible pattern in accordance with the present invention.
Figure 4:
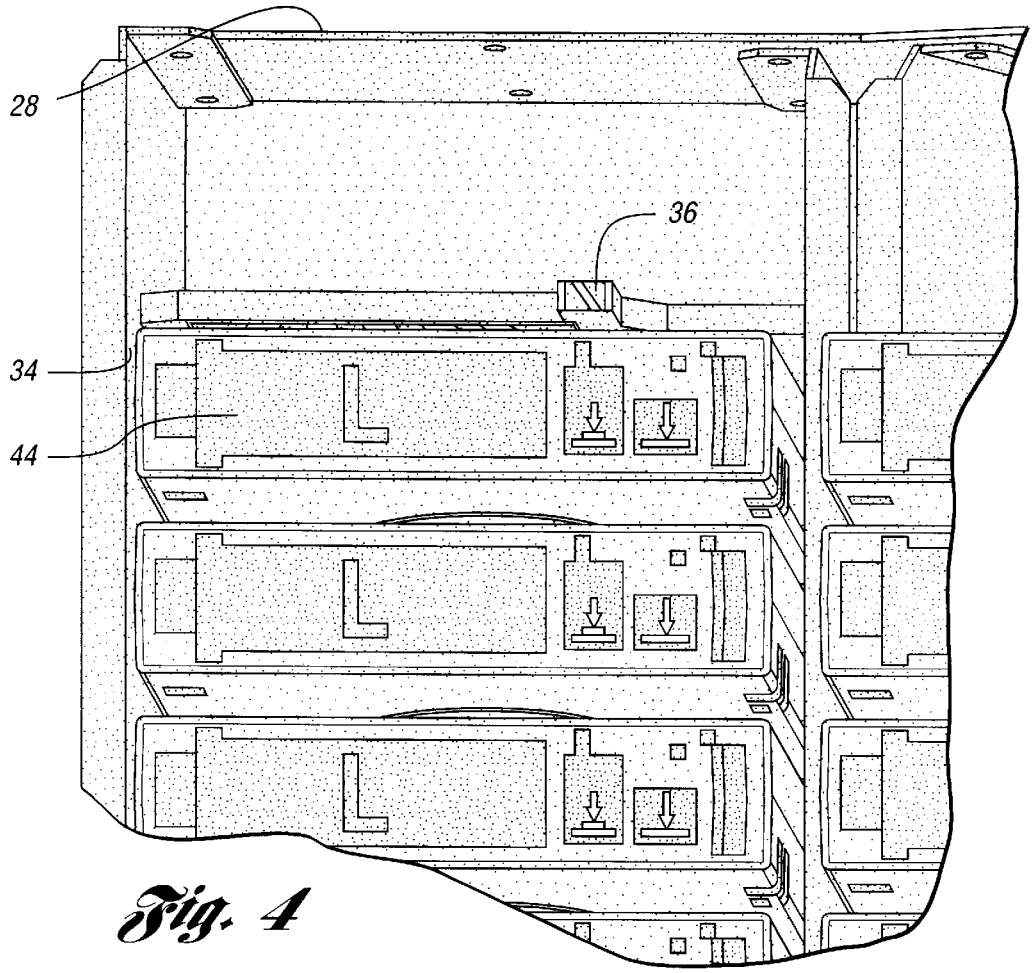
FIG. 4 shows a cut-away perspective view of the cells of FIG. 3 with the visible pattern of the one cell being blocked by the presence of a cartridge within the particular cell.

Turning to FIGS. 3 and 4, a plurality of stacked cells 28 is shown in accordance with the present invention. In order to facilitate auditing of cartridges and empty cells, a visible pattern 30 is displayed on the inside top portion 32 of the cell 34, and will be similarly displayed on each of the plurality of cells 28 for auditing purposes. The visible pattern 30 is preferably a set of injection molded tapered raised ribs with a foil pattern heat stamped onto the ribs to form the visible pattern 30. In other words, each cell is individually injection molded, and the raised ribs are integrally molded therewith prior to the application of the heat stamped foil for forming the visible pattern 30. By molding and heat stamping the visible pattern 30, accuracy of placement of visible pattern 30 is achieved. Alternatively, an adhesive-backed label with the visible pattern displayed thereon could be applied to the inside top portion 32 of each cell. Other methods, such as pad stamping, silkscreening, color molding, hot stamping, etc., could also be used for applying the visible pattern. However, the pattern is more accurately displayed within the cell by molding ribs and heat-stamping the pattern. Therefore, less sophistication is required in the camera for accurately and repeatedly reading the pattern.

With this configuration, when a system audit is desired, the hand and camera assembly 10 is moved to a position adjacent the plurality of stacked cells 28. Preferably, the visible pattern 30 is displayed in each cell, while the target 36 is displayed in a lesser number of cells. The camera is then adjusted to a position such that the field of view 26 intersects the target 36 which is displayed on the stacked cells 28. The camera is centered upon the target 36 by moving vertically until the distance between lines 38 and 40 is equal to the distance between lines 40 and 42. At this point, the hand and camera assembly 10 zeros itself on the target. The hand and camera assembly 10 is then robotically moved vertically along the stacked row of cells 28 and takes all available data for auditing purposes.

As shown in FIG. 4, when a cartridge 44 is present within the cell 34, the visible pattern 30 is blocked from the camera's view. Accordingly, in this position the camera will not see the pattern 30, and will rather see a label placed on the face of the cartridge 44, or will recognize no label or pattern, in which case the assumption is made that an unlabeled cartridge is present within the cell.

Accordingly, the line-scan camera which already exists in many storage library systems may be used for accurate auditing of the library system by merely displaying a visible pattern within each cell in a manner such that the pattern will be visibly blocked when the cell is occupied by a cartridge.

Of course, the visible pattern need not be placed on the inside top portion 32 of each cell. The pattern may be positioned anywhere within the cell which is viewable by the line-scan camera, and in a position in which the pattern would be blocked by the presence of a cartridge. The pattern must be positioned within the camera's depth of field, i.e., close enough to its nominal object plane so that the camera can resolve the empty cell pattern.

Figure 5:
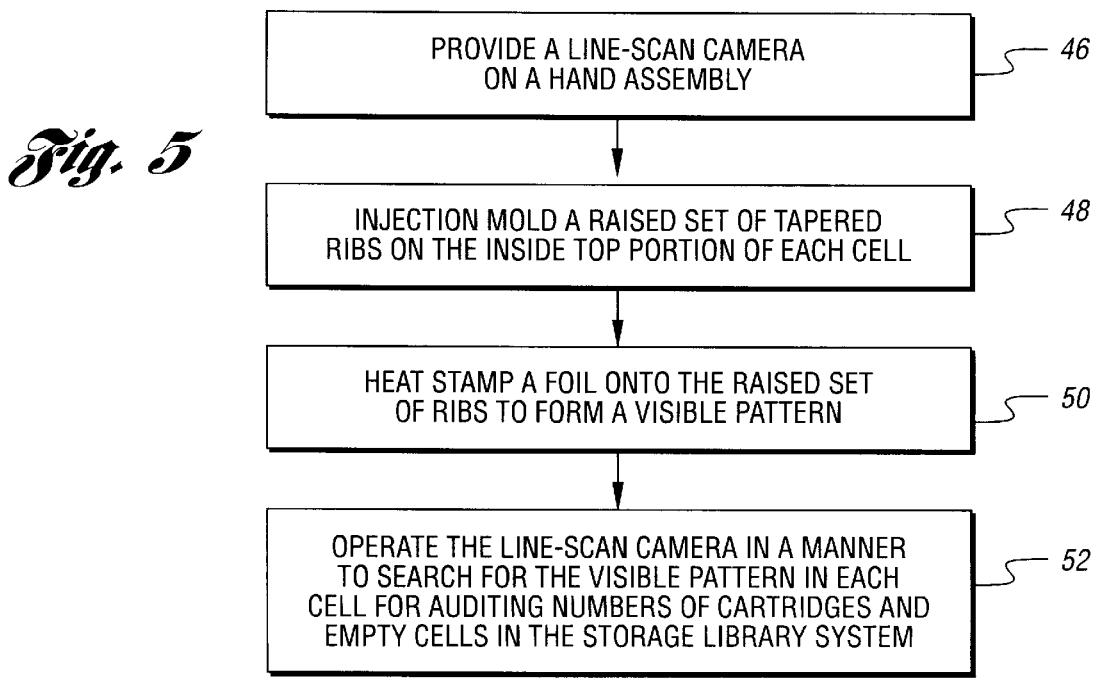
FIG. 5 illustrates a schematic flow diagram for a method of auditing cartridges and empty cells in accordance with the present invention.

Turning to FIG. 5, a method of auditing cartridges and empty cells in a storage library system is described schematically. The first step (step 46) is to provide a line-scan camera on the hand assembly 10. A raised set of tapered ribs is injection molded on the inside top portion of each cell (step 48). A foil is heat stamped onto the raised set of ribs to form a visible pattern (step 50). The line-scan camera is then operated in a manner to search for the visible pattern in each cell for auditing numbers of cartridges and empty cells in the storage library system (step 52).

While the best mode for carrying out the invention has been described in detail, those familiar with the art to which this invention relates will recognize various alternative designs and embodiments for practicing the invention within the scope of the appended claims.

What is claimed is:

1. A method of auditing cartridges and empty cells in a storage library system including a plurality of fixed cells for storing cartridges and further including a robotically actuated hand assembly, the method comprising:

providing a line-scan camera on the hand assembly;

positioning a visible pattern within each cell such that the visible pattern is readable by the line-scan camera when the line-scan camera is moved to a position adjacent the particular cell if the particular cell is empty, and such that the presence of a cartridge within the particular cell would prevent viewing of the visible pattern within the cell by the line-scan camera; and operating the line-scan camera in a manner to search for the visible pattern within each cell for auditing numbers of cartridges and empty cells in the storage library system.

2. The method of claim 1, wherein each cell includes an inside top portion and said step of positioning a visible pattern within each cell comprises positioning the visible pattern on the inside top portion of each cell.

3. The method of claim 2, wherein said step of positioning a visible pattern within each cell further comprises:

injection molding a raised set of tapered ribs on the inside top portion of each cell; and heat stamping a foil onto said raised set of ribs to form the visible pattern.

4. The method of claim 2, wherein said step of providing a line-scan camera on the hand assembly comprises positioning the camera below the hand assembly and tilting the camera to create a field of view plane which extends angularly upward away from the camera such that the camera is alignable with a particular cell in a predetermined position for viewing the visible pattern if the cell is empty and for viewing a bar code pattern on a cartridge if such a cartridge is positioned within the cell.

5. An apparatus for auditing cartridges and empty cells in a storage library system including a plurality of fixed cells for storing cartridges and further including a robotically actuated hand assembly, the apparatus comprising:

a line-scan camera secured to the hand assembly; and a visible pattern displayed within each cell such that the visible pattern is readable by the line-scan camera when the line-scan camera is positioned adjacent the particular cell if the particular cell is empty and such that the presence of a cartridge within the particular cell would prevent viewing of the visible pattern within the cell by the line-scan camera;

wherein the hand assembly is operative to move the line-scan camera in a manner to search for the visible pattern within each cell for auditing numbers of cartridges and empty cells in the storage library system.

6. The apparatus of claim 5, wherein each cell includes an inside top portion and said line-scan camera is positioned below the hand assembly and each visible pattern is displayed on the inside top portion of each cell.

7. The apparatus of claim 5, wherein said visible pattern comprises a raised set of tapered plastic ribs with a foil heat stamped thereon to form the visible pattern.

8. A method of auditing cartridges and empty cells in a storage library system including a plurality of fixed cells for storing cartridges and further including a robotically actuated hand assembly, wherein each cell includes an inside top portion, the method comprising:

providing a line-scan camera on the hand assembly;

injection molding a raised set of tapered ribs on the inside top portion of each of the plurality of cells;

heat stamping a foil onto said raised set of ribs to form a visible pattern within each cell such that the visible pattern is readable by the line-scan camera when the line-scan camera is moved to a position adjacent the particular cell if the particular cell is empty and such that the presence of a cartridge within the particular cell would prevent viewing of the visible pattern within the cell by the line-scan camera; and operating the line-scan camera in a manner to search for the visible pattern within each cell for auditing numbers of cartridges and empty cells in the storage library system.

* * * * *